April 29, 1924.
B. WITMER
BEARING
Filed Nov. 23, 1921
1,491,978
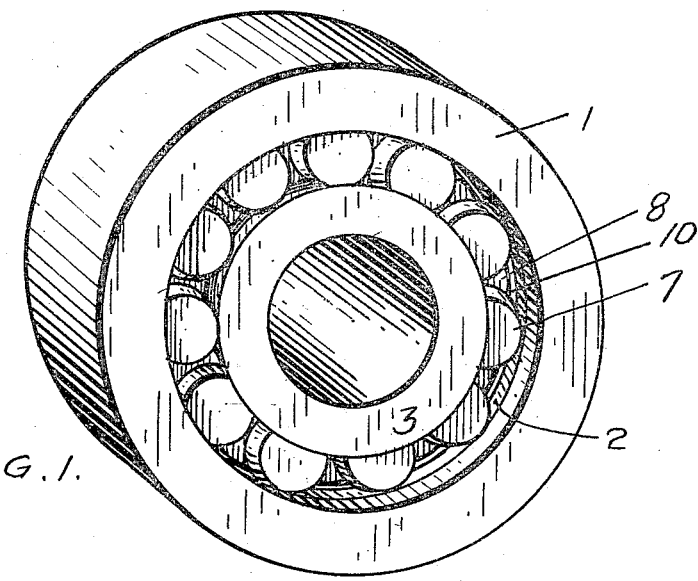
FIG.1.
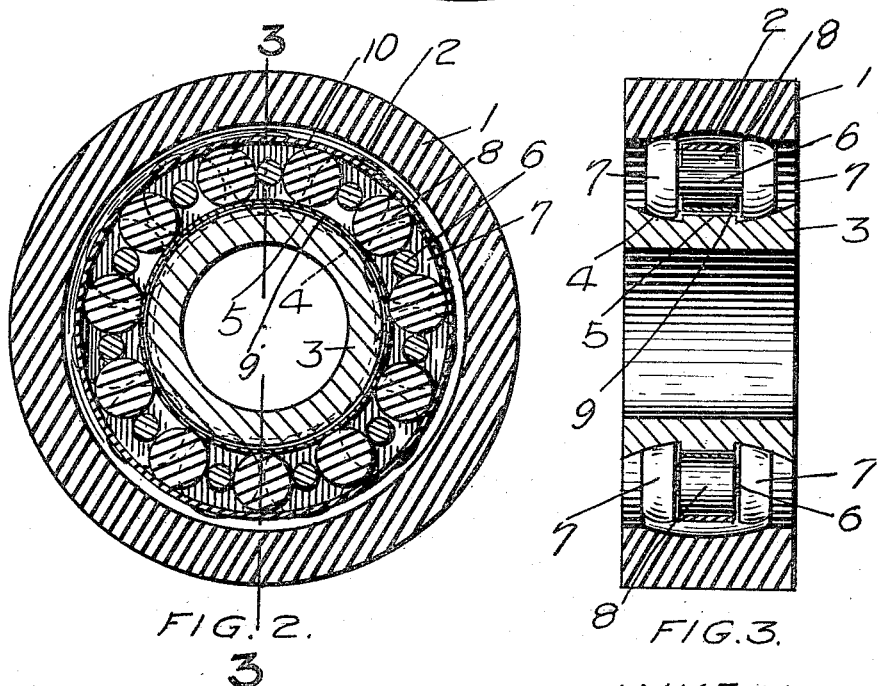
FIG.2.
FIG.3.
INVENTOR
BENJAMIN WITMER
BY
ATTORNEYS.

Patented Apr. 29, 1924.

1,491,978

UNITED STATES PATENT OFFICE.

BENJAMIN WITMER, OF DETROIT, MICHIGAN.

BEARING.

Application filed November 23, 1921. Serial No. 517,407.

*To all whom it may concern:*

Be it known that I, BENJAMIN WITMER, a subject of the King of Great Britain, and a resident of the city of Detroit, in the county of Wayne, in the State of Michigan, in the United States of America, have invented certain new and useful Improvements in Bearings, of which the following is the specification.

My invention relates to improvements in bearings and the object of the invention is to devise a bearing particularly adapted to the carrying of line shafting and therefore self-aligning, which will reduce the friction to a minimum producing an easy and smooth running bearing thereby economizing the power and it consists essentially of inner and outer annular members provided with opposing annular races, a series of rollers each comprising a central shank portion and end enlargements or heads contacting with the inner and outer races, spacing rollers larger in diameter than the aforesaid shanks and interposed between each pair of the same and inner and outer floating bearing rings located between the heads of the aforesaid rollers and between which the spacing rollers are interposed so as to have contact therewith, and means in the inner race for holding the headed rollers in alignment as hereinafter more particularly explained by the following specification.

Fig. 1 is a perspective view of my bearing.
Fig. 2 is a sectional view through Fig. 1.
Fig. 3 is a vertical section on line 3—3, Fig. 2.

In the drawings like characters of reference indicate corresponding parts in each figure.

1 indicates the outer annular member provided with an internal race 2 which is preferably formed in an arc in cross section concentric with the centre of the bearing. 3 is the inner member of the bearing provided with an exterior race 4 arc-shaped in cross section so as to correspond with the arc of the outer race 2. 5 is an annular projection located in the centre of the race 4 for a purpose which will hereinafter appear.

The main rollers of the bearing consist of a central portion 6 in the form of a cylindrical shank terminating at each end in enlargements 7 preferably segmental ball-shaped in form so that the periphery thereof contacting with the inner and outer races 2 and 4 is of an arc smaller in radius than the arcs of the races 2 and 4.

8 are spacing rollers which are interposed between the shank portions 6 of the main rollers having free contact therewith. 9 is an inner floating ring having an internal diameter slightly larger than the external diameter of the annular projection 5 sufficient to provide for a slight clearance therebetween.

The spacing rollers 8, as will be readily seen from Figure 2, are larger in diameter than the shank portion 6 and run upon the exterior periphery of the ring 9. 10 is an outer floating ring which is carried upon the spacing rollers 8 so as to freely rotate therewith.

It will be noted that the rings 9 and 10 are located between the heads 7 of the main rollers and are therefore held from lateral movement. The rings 9 and 10 being floating rings are both free to rotate driven by a frictional contact with the rollers 8 as such rollers revolve.

The cross section arc of the race 2 being concentric with the centre of the bearing permits of the inner member 3 and the rollers and coacting parts carried thereby to swing to any desired angular position to correspond with the alignment of the shafting which is carried thereby.

By this construction it will be readily seen that the spacing rollers interposed between the main rollers are revolved with a minimum amount of friction, the rings 9 and 10 rotating therewith and thereby providing an easy and smooth running bearing.

What I claim as my invention is:

1. A bearing comprising an outer annular member provided with an internal annular race-way, an internal annular member provided with an external annular race-way, main rollers each comprising a central cylindrical shank and a circular enlargement or head at each end, spacing rollers interposed between the shanks of the main rollers and of larger diameter than said shanks, concentric floating rings with which the inner and outer peripheral portions of the spacing rollers have rolling contact, and means for holding the main rollers in annular alignment.

2. A bearing comprising an annular outer member having an internal annular race-way, an internal annular member provided with an external annular race-way having an annular projection located centrally therein, bearing rollers each comprising a cylindrical shank having a circular enlargement at each end located at each side of the annular projection of the inner race, spacing rollers located between the shanks and of larger diameter than the same, an inner floating ring freely surrounding the aforesaid annular projection and upon which the spacing rollers bear, and an outer floating ring interposed between the enlargement of the main rollers and bearing upon the outer peripheral portions of the spacing rollers.

BENJAMIN WITMER.